United States Patent
Tomita et al.

[11] Patent Number: 6,099,244
[45] Date of Patent: Aug. 8, 2000

[54] COOLED STATIONARY BLADE FOR A GAS TURBINE

[75] Inventors: Yasuoki Tomita; Hiroki Fukuno; Kiyoshi Suenaga, all of Takasago, Japan

[73] Assignee: Mitsubishi Heavy Industries, Ltd., Tokyo, Japan

[21] Appl. No.: 09/038,376

[22] Filed: Mar. 11, 1998

[30] Foreign Application Priority Data

Mar. 11, 1997 [JP] Japan ................................ 9-056271

[51] Int. Cl.$^7$ ................................................ F01D 5/08
[52] U.S. Cl. ........................ 415/115; 415/116; 416/96 R; 416/97 R
[58] Field of Search .......................... 415/115, 116; 416/96 R, 97 R, 96 A

[56] References Cited

U.S. PATENT DOCUMENTS

| | | | |
|---|---|---|---|
| 4,616,976 | 10/1986 | Lings et al. | 416/97 R |
| 4,946,346 | 8/1990 | Ito | 415/115 |
| 5,488,825 | 2/1996 | Davis et al. | 60/39.75 |
| 5,609,466 | 3/1997 | North et al. | 415/115 |

*Primary Examiner*—Edward K. Look
*Assistant Examiner*—Ninh Nguyen
*Attorney, Agent, or Firm*—Alston & Bird LLP

[57] ABSTRACT

In the present invention, seal air passes through a tube extending in a stationary blade from an outside shroud to an inside shroud, flows into a cavity to keep the pressure in the cavity high so as to seal the high-temperature combustion gas, and is discharged to a passage. Part of cooling air flows into an air passage to cool the leading edge portion, passes through the peripheral portion of the inside shroud to cool the same, and is discharged to a passage. The remaining cooling air flows into a passage, passes through a serpentine cooling flow path consisting of air passages having turbulators, and is discharged through air cooling holes formed at the trailing edge. The cooling air passing through the passage at the leading edge portion cools the peripheral portion of the inside shroud as well as the leading edge portion of blade, by which the cooling efficiency is increased.

6 Claims, 4 Drawing Sheets

FIG. I

COOLED STATIONARY BLADE FOR A GAS TURBINE

FIELD OF THE INVENTION AND RELATED ART STATEMENT

The present invention relates to a cooled stationary blade for a gas turbine and, more particularly, to a cooled stationary blade for a gas turbine, in which a shroud as well as a stationary blade is cooled by air to increase the cooling efficiency.

Generally, for the stationary blade for a gas turbine, seal air is sent to an inside shroud and the blade interior is cooled by air. Regarding the inside shroud, although there is an example in which cooling air is sent to the inside shroud, a construction in which the inside shroud is positively cooled is not realized at present. FIG. 4 is a sectional view of the interior of a gas turbine stationary blade, showing an example of a conventional air-cooled blade.

In FIG. 4, reference numeral 50 denotes a stationary blade, 51 denotes an outside shroud, 52 denotes an inside shroud, 53 denotes a seal air tube passing through the blade interior from the outside shroud 51 and penetrating the inside shroud 52, and 54A, 54B, 54C, 54D and 54E denote air passages. These air passages form a serpentine flow path by extending upward and downward alternately in the blade. Reference numeral 55 denotes a turbulator provided in the air passages 54A to 54E. The turbulator 55 produces a turbulent flow of air in the blade to increase the thermal conductivity. Reference numeral 56 denotes a cavity formed under the inside shroud 52.

In the stationary blade having the construction described above, seal air 200 flows into the tube 53 from the outside shroud 53 side, enters the cavity 56 under the inside shroud 52 to keep the pressure in the cavity 56 higher than that in a combustion gas passage, and is discharged to the combustion gas passage through a passage and seal portion (not shown). This high pressure in the cavity 56 prevents high-temperature combustion gas from entering the blade interior from the outside.

Also, cooling air 100 flows into the air passage 54A at the leading edge portion, flows upward in the next passage 54B from the inside shroud 52 at the lower portion, flows in the air passages 54C, 54D and 54E in succession, and is discharged through cooling air holes 57 in the trailing edge portion. At this time, the flow of cooling air flowing in the air passages 54A to 54E is made turbulent by the turbulators 55 in the air passages, so that the thermal conductivity is increased and the cooling effect is enhanced. The cooling air 100 comes into contact with the surface of the inside shroud 52 in the course of flow in the flow path toward the trailing edge side, so that this surface is also cooled partially. Such a cooling system is most effective from the viewpoint of manufacture especially for a large curved blade at the turbine rear stage.

In the above-described conventional stationary blade, the whole blade is cooled effectively by the cooling air 100 and the seal air 200 is surely supplied through the tube 53. However, the inside shroud 52 is cooled insufficiently because it is not constructed so as to be cooled positively. In particular, at the trailing edge portion of the inside shroud 52, the cooling air flows in the passages 54A, 54B, and so on in succession to cool the blade, and is heated as it flows toward the rear, so that the cooling effect at the rear portion tends to decrease gradually.

Also, since the cooling air 100 flows inside the blade, the cooling air 100 comes into contact with only the surface of the inside shroud on which the blade is positioned, and does not come into contact with the peripheral surface of the inside shroud 52, so that the peripheral surface thereof is scarcely cooled, producing a temperature difference between the surface under blade and the peripheral surface. Therefore, a thermal stress occurs, which is undesirable to the blade for a high-temperature gas turbine.

OBJECT AND SUMMARY OF THE INVENTION

Accordingly, a first object of the present invention is to provide a cooled stationary blade for a gas turbine, which is configured so that the blade interior is air-cooled and the whole of an inside shroud is also cooled positively to increase the cooling effect of the whole stationary blade including the blade and shroud.

A second object of the present invention is to, in addition to the above object, provide a cooled stationary blade for a gas turbine, which is constructed so that uniform cooling can be performed on the leading edge side and trailing edge side of an inside shroud to further increase the cooling effect.

Therefore, the present invention provides means of (1) described below to achieve the first object, and means of (2) to achieve the second object.

(1) In a cooled stationary blade for a gas turbine, having an air flow inlet in an outside shroud of gas turbine stationary blade and provided with an air passage communicating with the blade interior to cool the blade interior with cooling air allowed to flow through the air flow inlet, the air passage comprises a passage communicating with the blade interior to cool the blade and a passage extending in the blade interior independently of the aforesaid passage, entering an inside shroud, and communicating with a cooling passage at the peripheral portion of the inside shroud.

(2) In the above item (1), the air passage communicating with the inside shroud is provided at the leading edge portion of blade, and the air passage communicating with the blade interior is provided at the rear thereof.

In the above item (1) of the present invention, cooling air flows into the air passage communicating with the blade interior from the outside shroud to cool the blade by serpentine cooling as in the case of the conventional cooled stationary blade, and is discharged to the combustion gas passage from the trailing edge of blade. On the other hand, cooling air entering the air passage provided independently of the aforesaid passage cools the blade in the course of downward flow in the blade, flows into the inside shroud, enters the cooling passage provided at the peripheral portion of the inside shroud to cool the peripheral portion of the inside shroud, and is discharged to the combustion gas passage through air holes at the rear of the shroud.

Therefore, in the invention of the above item (1), the blade interior is cooled and also the peripheral portion of the inside shroud is cooled. The under surface of the inside shroud on which the blade is positioned is cooled by the cooling air flowing in the passage communicating with the blade interior, and the peripheral portion of the inside shroud is cooled by the cooling air supplied from the independent passage. Therefore, the whole shroud is cooled uniformly, so that the occurrence of a thermal stress due to a temperature difference is prevented.

In the above item (2) of the present invention, the passage for cooling air supplied to the inside shroud is provided at the leading edge portion of blade. Therefore, the cooling air passing through this passage enters the inside shroud from the front portion of shroud after cooling the leading edge portion of blade, and flows in the peripheral portion of shroud to the rear, so that all of the peripheral portion of shroud ranging from the leading edge portion to the trailing edge portion can be cooled uniformly.

In the item (1) of the present invention, the cooled stationary blade for a gas turbine is configured so that the air passage comprises a passage communicating with the blade interior to cool the blade and a passage extending in the blade interior independently of the aforesaid passage, entering an inside shroud, and communicating with a cooling passage at the peripheral portion of the inside shroud. Therefore, the blade interior is cooled by the cooling air flowing in the air passage communicating with the blade interior, and the peripheral portion of the inside shroud is cooled by the cooling air supplied by the independent air passage, so that the whole stationary blade is cooled uniformly, by which the occurrence of a thermal stress due to a temperature difference in the inside shroud can be prevented.

In the item (2) of the present invention, the air passage communicating with the inside shroud is provided at the leading edge portion of blade, and the air passage communicating with the blade interior is provided at the rear thereof. Therefore, the cooling air for cooling the inside shroud flows into the shroud from the leading edge portion of the inside shroud, and the cooling air is allowed to flow from the front end of shroud to the rear end thereof, so that the effect of the above item (1) can be increased further.

DETAILED DESCRIPTION OF PREFERRED EMBODIMENTS

Figure 1:
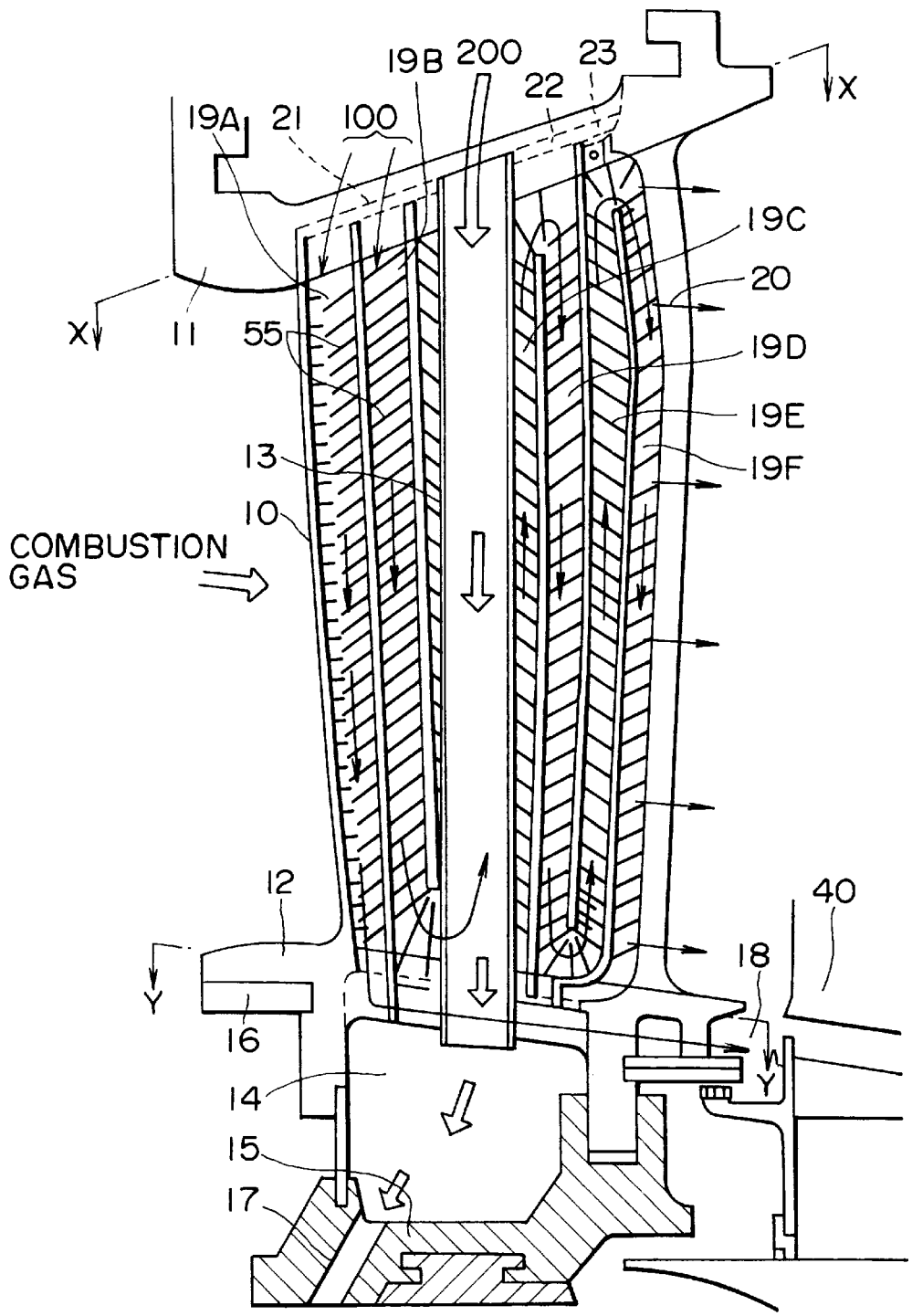
FIG. 1 is a sectional view of a cooled stationary blade for a gas turbine in accordance with one embodiment of the present invention.
Figure 2:
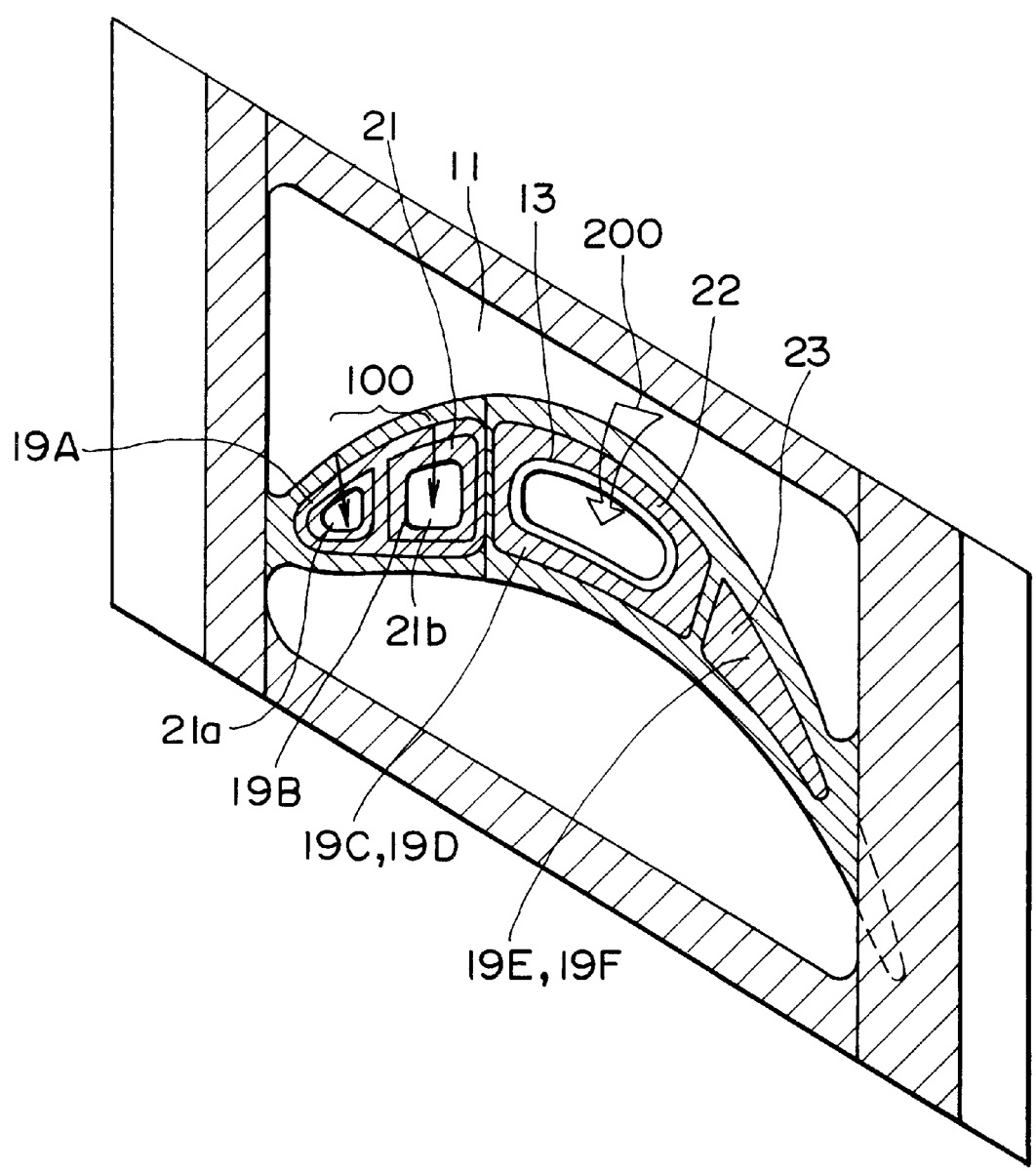
FIG. 2 is a sectional view taken along the line X—X of FIG. 1.
Figure 3:
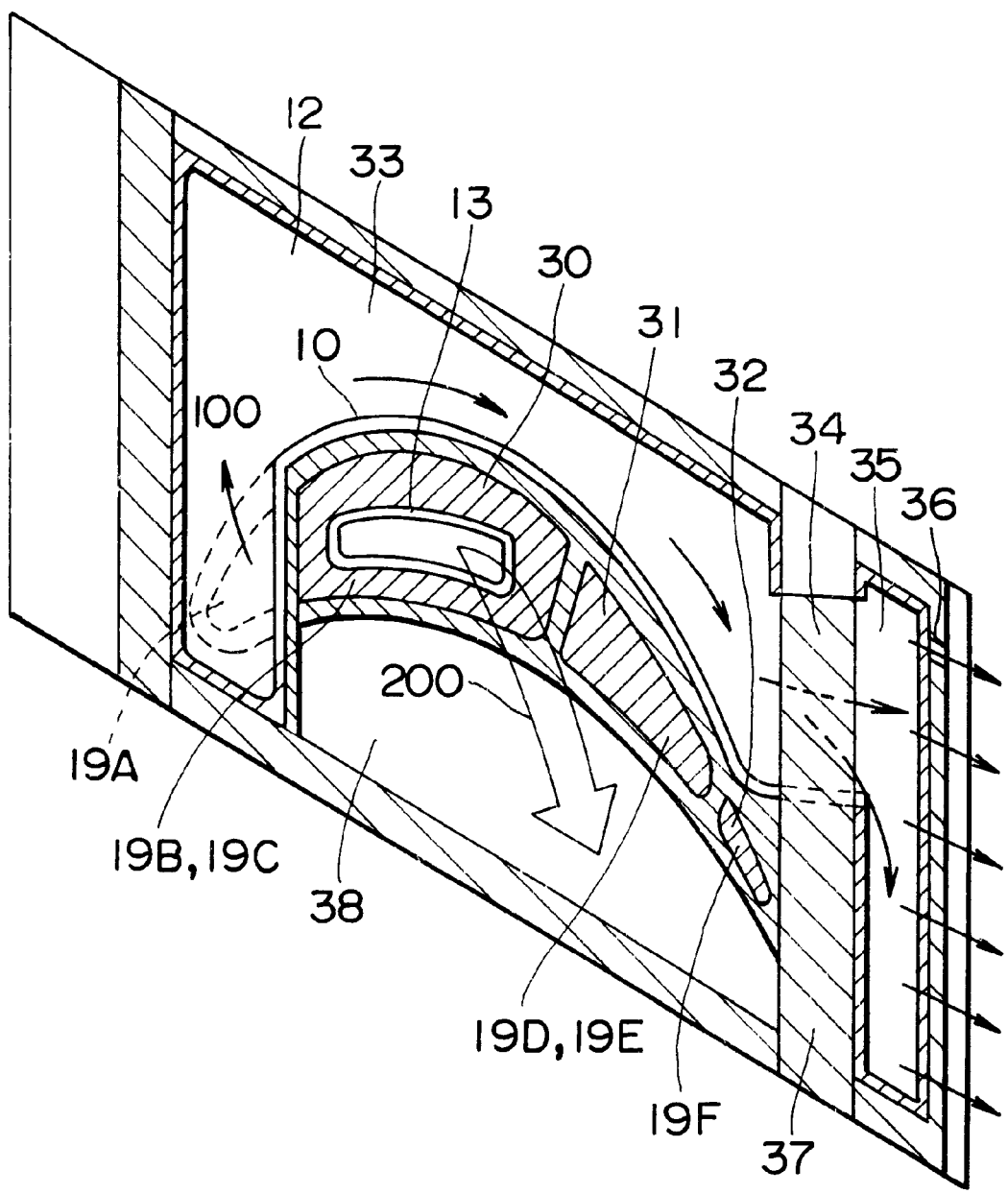
FIG. 3 is a sectional view taken along the line Y—Y of FIG. 1.
Figure 4:
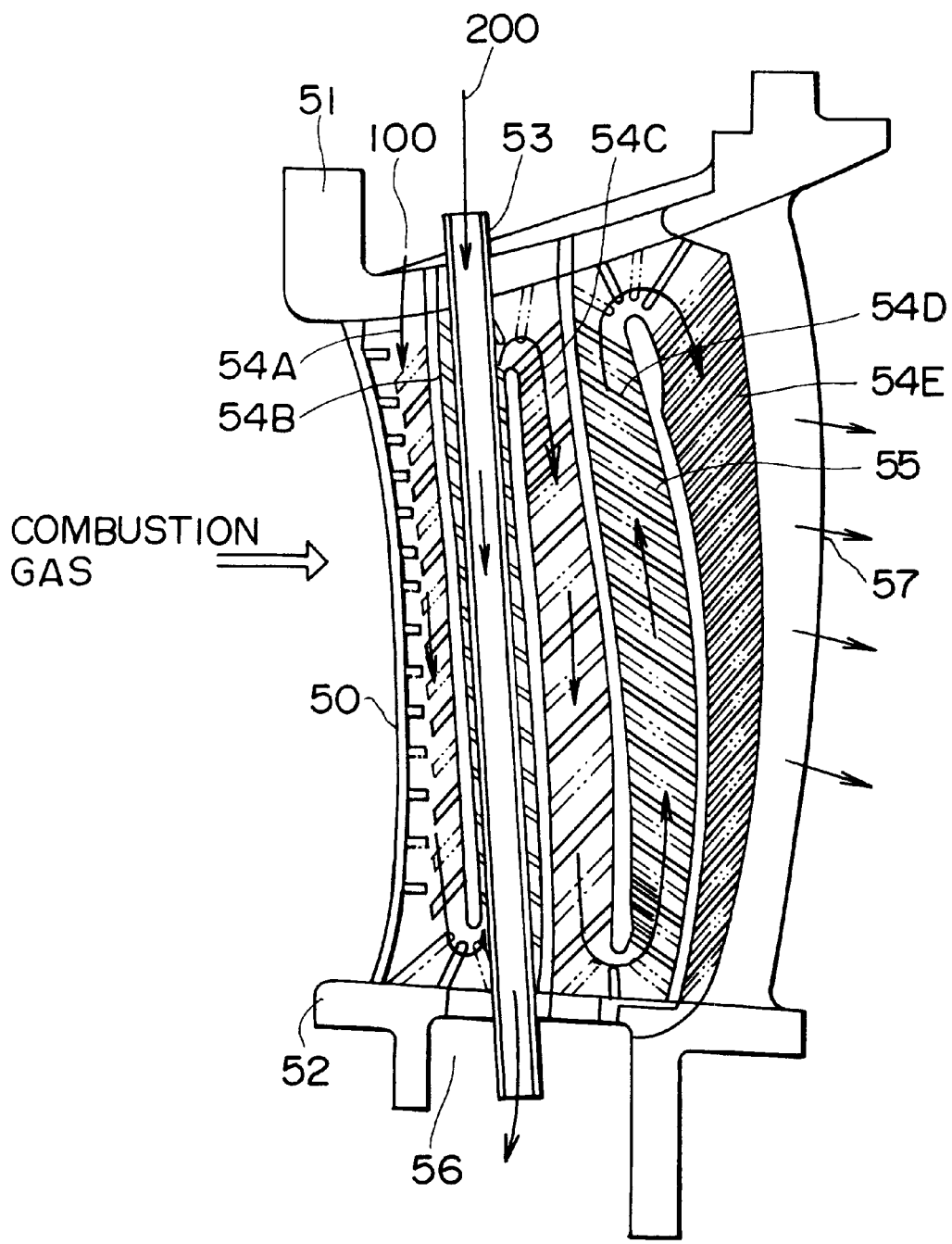
FIG. 4 is a sectional view of a conventional cooled stationary blade for a gas turbine.

An embodiment of the present invention will be described in detail with reference to the accompanying drawings. FIG. 1 is a sectional view of a stationary blade, showing the construction of a cooled stationary blade for a gas turbine in accordance with one embodiment of the present invention, FIG. 2 is a sectional view taken along the line X—X of FIG. 1, showing the interior of the outside shroud, FIG. 3 is a sectional view taken along the line Y—Y of FIG. 1, showing the interior of the inside shroud.

In FIG. 1, reference numeral 10 denotes a stationary blade, 11 denotes an outside shroud, 12 denotes an inside shroud, 13 denotes a seal air tube passing through the blade interior from the outside shroud 11 and penetrating the inside shroud 12, 14 denotes a cavity under the inside shroud 12, 15 denotes a seal box, 16 denotes a passage provided between the stationary blade 10 and a rotating blade 40, 17 denotes an air hole formed in the seal box 15 to connect the cavity 14 to the passage 16, and 18 denotes a passage provided between the trailing edge end of the inside shroud 12 and the rotating blade 40.

Reference numeral 19A denotes an independent air passage for sending cooling air 100 to the inside shroud 12, 19B, 19C, 19D, 19E and 19F denote air passages in which the cooling air 100 flows upward and downward alternately in succession to cool the blade, forming a serpentine cooling flow path, 20 denotes many cooling air holes formed at the trailing edge of the stationary blade 10, 21 denotes a flow rate regulating orifice for regulating the flow rate of air flowing into the air passages 19A and 19B, and 22 and 23 denote covers, described later.

The air passages 19A to 19F are provided with turbulators 55 for making the air flow turbulent to increase the thermal conductivity.

FIG. 2 shows the outside shroud 11. In this figure, the stationary blade 10 is divided into the air passages 19A to 19F as described above. The upper faces of the air passages 19A and 19B have holes 21a and 21b, respectively, and are provided with the flow rate regulating orifice 21 for regulating the flow rate of cooling air flowing into the air passages. Around the tube 13 is provided a cover 22 for covering the passages 19C and 19D. Also, on the upper face of the air passages 19E and 19F, a cover 23 is provided. These covers 22 and 23 make the air passages airtight so that the cooling air flows in the blade completely.

FIG. 3 shows the inside shroud 12. In this figure, a cover 30 for covering the air passages 19B and 19C is provided around the lower part of the tube 13. Further, a cover 31 for covering the air passages 19D and 19E and a cover 32 for covering the air passage 19F are provided. Around the lower part of the inside shroud 12 of the stationary blade 10 is formed an air passage 33 which is filled with the cooling air 100 having cooled the leading edge portion while flowing in the air passage 19A.

Around the lower part of the inside shroud 12, a seal air space 38, into which seal air 200 flowing out of the seal air tube 13 flows, is provided. Further, a passage 35 is provided on the trailing edge side, and a recess 34 for connecting the passage 35 to the air passage 33 is provided in a structural member 37. Many cooling air holes 36 are formed at the trailing edge of the inside shroud 12.

In the stationary blade 10 configured as described above, as shown in FIG. 1, the seal air 200 is supplied from the outside shroud 11 side into the tube 13, passes through the tube 13, and flows into the cavity 14, so that the pressure in the cavity 14 is kept higher than that of the combustion gas passage. The air flowing into the cavity 14 goes to the passage 16 through the air hole 17 formed in the seal box 15, passes through the passage 16, and is discharged to the combustion gas passage. This high pressure in the cavity 14 prevents high-temperature combustion gas from entering the blade.

On the other hand, as shown in FIG. 2, the cooling air 100 flows into the air passages 19A and 19B through the holes 21a and 21b of the flow rate regulating orifice 21 with a predetermined flow rate. The cooling air 100 flowing into the air passage 19A at the leading edge portion flows down while cooling the leading edge portion of blade, flows out of the air passage 19A as shown in FIG. 3, fills the air passage 33 around the inside shroud 12, flows around the dorsal side to cool the whole shroud, passes through the recess 34, enters the passage 35, and flows out through the cooling air holes 36 at the trailing edge.

In FIG. 3, the seal air 200 flows out of the tube 13 as described with reference to FIG. 1, enters the seal air space 38, flows into the cavity 14 communicating with the seal air space 38 to produce a high pressure in the cavity 14.

The cooling air 100 flowing into the air passage 19B flows upward and downward alternately in the air passages 19C, 19D, 19E and 19F having the turbulators 55 to cool the interior of blade as in the case of the conventional stationary blade, and flows out through the cooling air holes 20 at the trailing edge. Since the end portions of these air passages at the outside shroud 11 and inside shroud 12 are closed by the covers 22, 23, 30, 31 and 32 as described with reference to FIGS. 2 and 3,. the cooling air 100 flows in the blade toward the trailing edge without leakage.

Also, since the air passage 19A for allowing the cooling air 100 to flow to the inside shroud 12 is provided at the leading edge portion, the cooling air 100 flows into the inside shroud 12 from the leading edge side thereof and flows from the front end of shroud to the rear end thereof, so that the whole peripheral region of the inside shroud 12 can be cooled uniformly.

The cooling blade 10 of the above-described embodiment is so configured that the leading edge portion on the upstream side of the high-temperature combustion gas, which is subject to the highest temperature, is cooled by allowing cold cooling air to flow in the air passage 19A, and the air is allowed to flow out to the air passage 33 in the inside shroud 12 to uniformly cool the peripheral portion of the inside shroud 12, entering the passage 35 on the trailing edge side, and is discharged through the cooling air holes 36, so that the peripheral portion of the inside shroud 12 is cooled uniformly.

The portion of the inside shroud 12 under the blade is cooled by allowing cooling air to flow by the serpentine cooling system as in the case of the conventional stationary blade. In addition, the peripheral portion of the shroud is cooled in the above-described manner. Therefore, the temperature difference caused by nonuniform cooling of the inside shroud 12 is eliminated, and the occurrence of a thermal stress can be prevented.

We claim:

1. A cooled stationary blade assembly for a gas turbine, comprising:
    a blade having a leading edge, a trailing edge, an outer end and an inner end, and the blade defining an internal first blade cooling passage and an internal second blade cooling passage, wherein the first blade cooling passage is arranged for directing a first flow of air through the blade and discharging the first flow from the trailing edge of the blade;
    an inside shroud connected to the inner end of the blade and comprising a leading side and a trailing side, wherein the inside shroud defines a shroud cooling passage therein, the second blade cooling passage is arranged for directing a cooling second flow of air through the blade to the shroud cooling passage, and the shroud cooling passage is arranged for discharging the second flow from the trailing side of the inside shroud; and
    an outside shroud connected to the outer end of the blade and operative to supply the first flow to the first passage and a further operative to supply the second flow to the second passage, wherein the first passage, the second passage and the shroud passage are arranged so that the portion of the first flow that is downstream from the outside shroud and upstream from the trailing edge of the blade is isolated from the portion of the second flow that is downstream from the outside shroud and upstream from the trailing side of the inside shroud, whereby the blade and the outside shroud may be optimally cooled.

2. The cooled stationary blade assembly of claim 1 wherein the first blade cooling passage is a serpentine passage having a plurality of longitudinal flow path portions extending lengthwise along the blade and a plurality of turning portions which connect adjacent pairs of longitudinal portions at the outer and inner ends of the blade.

3. The cooled stationary blade assembly of claim 1 wherein the first blade cooling passage extends through a portion of the blade that is proximate to the leading edge of the blade, and the shroud cooling passage is arranged to receive cooling air from the first blade cooling passage at a location adjacent the leading edge of the inside shroud.

4. The cooled stationary blade assembly of claim 1, further comprising an orifice that defines an opening to the first blade cooling passage and through which the first flow is supplied to the first blade cooling passage, wherein the orifice is operative for regulating the first flow.

5. The cooled stationary blade assembly of claim 1, further comprising an orifice that defines an opening to the second blade cooling passage and through which the second flow is supplied to the second blade cooling passage, wherein the orifice is operative for regulating the second flow.

6. The cooled stationary blade assembly of claim 1, further comprising:
    a seal box defining an outlet from a cavity defined between the seal box and the inner shroud; and
    a seal air passage passing through the blade interior from the outside shroud and penetrating the inside shroud, the seal air passage being arranged to deliver a sealing flow into the cavity and the outlet being arranged to direct the sealing flow out of the cavity, wherein the seal air passage, the cavity and the outlet are arranged so that the portion of the sealing flow that is flowing through the seal air passage, the cavity and the outlet is isolated from the portion of the first flow that is downstream from the outside shroud and upstream from the trailing edge of the blade, and is also isolated from the portion of the second flow that is downstream from the outside shroud and upstream from the trailing side of the inside shroud.

* * * * *

UNITED STATES PATENT AND TRADEMARK OFFICE
CERTIFICATE OF CORRECTION

PATENT NO. : 6,099,244
DATED : August 8, 2000
INVENTOR(S) : Tomita et al.

It is certified that error appears in the above-identified patent and that said Letters Patent is hereby corrected as shown below:

Column 6, lines 18 and 21, "first", each occurrence, should read --second--.

Signed and Sealed this

Twenty-fourth Day of April, 2001

Attest:

NICHOLAS P. GODICI

Attesting Officer     Acting Director of the United States Patent and Trademark Office